United States Patent [19]

Tanaka et al.

[11] Patent Number: 4,626,700
[45] Date of Patent: Dec. 2, 1986

[54] HYDRAULIC RESERVOIR WITH FLUID LEVEL DETECTOR

[75] Inventors: Ryuichi Tanaka; Akira Tanaka, both of Kanagawa, Japan

[73] Assignee: Nippon Air Brake Co., Ltd., Kobe, Japan

[21] Appl. No.: 750,907

[22] Filed: Jul. 1, 1985

[30] Foreign Application Priority Data

Jul. 5, 1984 [JP] Japan ............ 59-101841[U]

[51] Int. Cl.⁴ .......................................... H01H 35/18
[52] U.S. Cl. .................. 307/118; 340/52 C; 73/308; 200/84 R; 200/84 C
[58] Field of Search ............ 307/118; 340/618, 52 C, 340/679; 116/110; 73/290 R, 307, 308, 309, 314, DIG. 5; 200/84 C, 84 R

[56] References Cited

U.S. PATENT DOCUMENTS

| 2,989,602 | 6/1961 | Nosenzo et al. | 200/84 R |
| 3,370,467 | 2/1968 | Healy | 73/DIG. 5 X |
| 4,082,930 | 4/1978 | Peeples | 200/84 C |
| 4,107,493 | 8/1978 | Nagara et al. | 200/84 C |
| 4,117,451 | 9/1978 | Sato et al. | 340/679 X |
| 4,227,171 | 10/1980 | Masuda et al. | 200/84 C X |
| 4,270,033 | 5/1981 | Hoffmann | 200/84 C |
| 4,276,161 | 6/1981 | Matsui et al. | 73/308 X |
| 4,500,761 | 2/1985 | Kubota et al. | 200/84 C |

FOREIGN PATENT DOCUMENTS 0119017 9/1980 Japan ............... 73/308
0130228 8/1982 Japan .

Primary Examiner—William M. Shoop, Jr.
Assistant Examiner—Shik Luen Paul Ip
Attorney, Agent, or Firm—McDougall, Hersh & Scott

[57] ABSTRACT

A hydraulic reservoir with fluid level detector includes a main body having an internal space for containing brake oil; a cap attached to the main body for covering a top opening of the main body; a diaphragm arranged across the top opening of the main body, the outer circumference of the diaphragm being held between the main body and the cap, and the space between the cap and the diaphragm communicating with the atmosphere; a reed switch fixed to the main body, a float provided with permanent magnet, so arranged as to be vertically movable in the internal space of the main body, the reed switch and the float with permanent magnet constituting a fluid level detector, and when the float with permanent magnet is positioned under a predetermined level, the reed switch being closed by magnetic force of the permanent magnet; an operating rod for pushing down the float, being vertically movable and able to be pushed down from the external against buoyancy of the float; and a cylindrical portion integrally formed with the diaphragm, being closed at the lower end, the operating rod being inserted into the cylindrical portion and the float being pushed down through the closed end of the cylindrical portion by the operating rod.

22 Claims, 3 Drawing Figures

HYDRAULIC RESERVOIR WITH FLUID LEVEL DETECTOR

BACKGROUND OF THE INVENTION

1. Field of the Invention

This invention relates to a hydraulic reservoir with fluid level detector for a vehicle.

2. Description of the Prior Art

A hydraulic reservoir with fluid level detector of prior art includes a main body having an internal space for containing brake oil; a cap attached to the main body for covering a top opening of the main body; a diaphragm arranged across the top opening of the main body, the outer circumference of the diaphragm being held between the main body and the cap, and the space between the cap and the diaphragm communicating with the atmosphere; a reed switch fixed to the main body, a flot provided with permanent magnet, so arranged as to be vertically movable in the internal space of the main body, the reed switch and the float with permanent magnet constituting a fluid level detector, and when the flot with permanent magnet is positioned under a predetermined level, the reed switch being closed by magnetic force of the permanent magnet; an operating rod for pushing down the float, being vertically movable and able to be pushed down from the external against buoyancy of the float.

A driver or operator will push down the operating rod for testing the fluid level detector. The float is pushed down under the predetermined level. When the fluid level detector is in order, the reed switch is closed by magnetic force of the permanent magnet, and a warning device such as a warning lamp connected to the reed switch is energized to inform the driver or operator that the fluid level detector is in order.

However, in the above hydraulic reservoir, an opening for inserting the operating rod is made in the diaphragm. Accordingly, when the hydraulic reservoir is shaked, there is the fear that brake oil flows out through the gap between the operating rod and the diapharagm at the opening, from the inside of the main body, into the space between the cap and the diaphragm and then to the external therefrom. It cannot be said that the diaphragm fulfills its proper function.

SUMMARY OF THE INVENTION

Accordingly, it is an object of this invention to provide a hydraulic reservoir with fluid level detector in which a diaphragm can fulfill its proper function.

Another object of this invention is to provide a hydraulic reservoir with fluid level detector which is sure in operation.

In accordance with an aspect of this invention, a hydraulic reservoir with fluid level detector includes; a main body having an internal space for containing brake oil; a cap attached to sain main body for covering a top opening of said main body; a diaphragm arranged across said top opening of the main body, the outer circumfeence of said diaphragm being held between said main body and said cap, and the space between said cap and said diaphragm communicating with the atmosphere; a reed switch fixed to said main body; a float with permanent magnet, so arranged as to be vertically movable in said internal space of the main body, said reed switch and said float with permanent magnet constituting a fluid level detector, and when said float with permanent magnet is positioned under a predetermined level, said reed switch being closed by magnetic force of said permanent magnet; operating means for pushing down said float, being vertically movable and able to be pushed down from the external against buoyancy of said float; and a cylindrical portion intergrally formed with said diaphragm, being closed at the lower end, said operating means being inserted into said cylindrical portion and said float being pushed down through the closed end of said cylincrical portion by said operating means.

The foregoing and other objects, features, and advantages of the present invention will be more readily understood upon consideration of the following detailed description of the preferred embodiment of the invention, taken in conjunction with the accompanying drawing.

DESCRIPTION OF THE PREFERRED EMBODIMENTS

Figure 1:
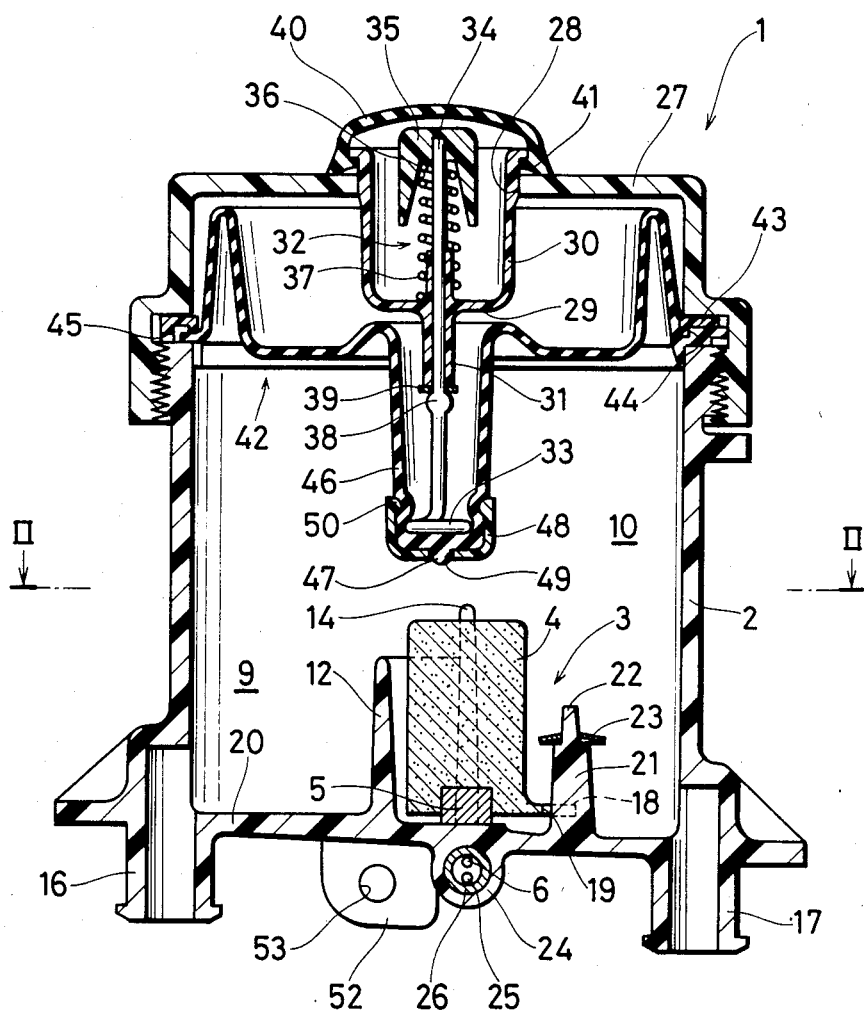
FIG. 1 is a longitudinal sectional view of a hydraulic reservoir with level detector according to one embodiment of this invention.
Figure 2:
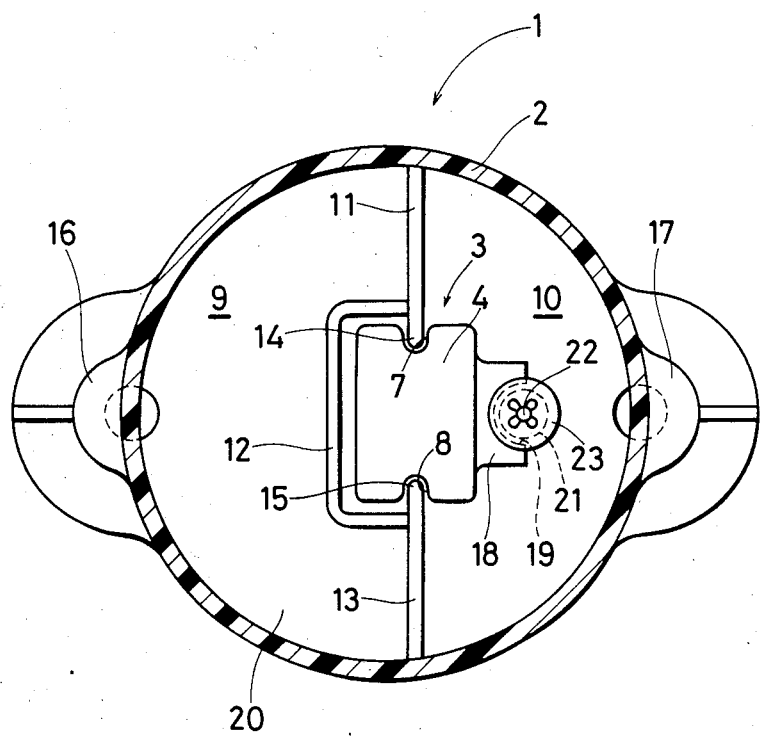
FIG. 2 is a cross-sectional view taken along the line II—II in FIG. 1.

A hydraulic reservoir with fluid level detector according to one embodiment of this invention will be described with reference to FIG. 1 to FIG. 3.

In the drawings, a hydraulic reservoir with level detector according to the one embodiment is generally denoted by a reference numeral 1. A fluid level detector 3 is arranged in a substantially cylindrical main body 2 made of synthetic resin, and it consists of a float 4, a permanent magnet 5 and a reed switch 6.

The float 4 is, for example, made of foaming styrol. Vertical grooves 7 and 8 are formed in the shorter sides of the float 4 as shown in FIG. 2. The lower portion of the inside of the main body 2 is positioned to fluid chambers 9 and 10 by walls 11, 12 and 13 which are integrally formed with each other in crank shape. The walls 11, 12 and 13 are further integrally formed with a side wall of the main body 2 and a bottom wall 20 thereof, extending upwardly from the latter. Lateral projections 14 and 15 of the walls 11 and 13 are slidably fitted into the grooves 7 and 8 of the float 4. Accordingly, the float 4 is vertically movable and guided by the lateral projections 14 and 15.

Fluid connection portions 16 and 17 are integrally formed with the main body 2. A not-shown tandem master cylinder is combined with the fluid connection portions 16 and 17. Thus, the fluid chambers 9 and 10 communicate through the fluid connection portions 16 and 17 with internal fluid pressure chambers of the tandem master cylinder. In this embodiment, the tandem master cylinder is so arranged as to be inclined relative to a horizontal line by some angles.

The permanent magnet 5 is in shape of rectangular parallelepiped, and it is fixed to the lower surface of the float 4. A flat lateral projection 18 is formed integrally with the lower and of the longer side of the float 4. A semi-circular cutout 19 is made in the top end of the flat lateral projection 18. A post 21 having a circular cross section is integrally formed with the bottom wall 20, extending upwardly from the latter. The diameter of the post 21 is smaller than that of the cutout 19 of the float 4. The cutout 19 is engaging with the post 21. A top end portion 22 of the post 21 is reduced in diameter. A dish-shaped spring 23 is elastically fixed to the top end portion 22. The float 4 is prevented from falling out from the post 21, by the dish-shaped spring 23. Thus, the latter functions as a stopper for the float 4.

A lateral projection 24 is formed in the outside of the bottom wall 20, extending horizontally from the front of the drawing paper (FIG. 1) towards the back thereof. A casing 26 for the reed switch 6 is inserted into a through hole 25 of the lateral projection 24, and it is molded with resin. The casing 26 is made of synthetic resin. The reed switch 6 has a well-known construction, and it is connected to a not-shown warning device such as warning lamp or buzzar. FIG. 1 shows that the reservoir 1 is empty. Accordingly, the permanent magnet 5 contacts with the bottom wall 20 corresponding to the position of the reed switch 6. When the reservoir 1 contains brake fluid, the float 4 floats in the brake fluid in accordance with the level of the brake fluid in the main body 12. When the brake fluid is so decreased that the permanent magnet 5 is close to the bottom wall 20 or contacts with the bottom wall 20, the reed switch 6 is closed to energize the not-shown warning device so as to warn the driver of the decrease of the brake fluid the level of which is lower than a predetermined level.

An internally threaded cap 27 formed of synthetic resin is engaged with the thread formed on the top end portion of the main body 2. A round opening 28 is formed in the center of the upper wall of the cap 27.

A cylindrical body 30 made of synthetic resin is elastically fitted to the opening 28 of the caps 27. The most of the cylindrical body 30 is positioned within the inside of the reservoir 1. It defines a recess extending towards the inside of the reservoir 1 almost from the upper wall of the cap 27. In the cylindrical body 30, an inner cylindrical portion 31 is integrally formed with a bottom wall portion 29, and it extends upwards and downwards from the bottom wall portion 29.

An operating rod 32 is slidably inserted through the inner cylindrical portion 31 of the cylindrical body 30. A lower end 33 of the operating rod 32 is formed in horizontal vortex, as shown in FIG. 3. An upper end 34 of the operating rod 32 is fixed to a push button 35 made of synthetic resin. A recess 36 is formed in the push botton 35. A compression spring 37 is arranged between the bottom of the recess 36 and the bottom wall portion 29 of the cylindrical body 30. The push button 35 is always urged upwards by the compression spring 37. A stopper portion 38 is formed in the operating rod 32 by pressing radially the latter, and it contacts through a ring 39 fitted to the operating rod 32, with the lower end of the cylindrical portion 31, by action of the compression spring 37. Thus, the upper position of the operating rod 32 is determined.

A dish-shaped flexible cover 40 is elastically fixed to the cylindrical body 30 and the cap 27 so as to cover the cylindrical body 30 and the push button 35. A lip 41 is formed in the margin of the cover 40, and it is pressed between the upper surface of the cap 27 and the top flange of the cylindrical body 30. Thus, water and dust are prevented from invading the inside of the reservoir 1.

A circumferential portion of a diaphragm 42 is fitted to a groove 44 of a fixing ring 43, and it is pinched between the cap 27 and the main body 2. It functions to prevent brake oil from flowing out from the inside of the reservoir 1. A cutout 45 is made in the fixing ring 43. A space between the diaphragm 42 and the cap 27 communicates through the cutout 45 with the atmosphere.

A cylindrical portion 46 is integrally formed with the center of the diaphragm 42. It extends downwards. Its lower end is closed. The lower end 33 of the operating rod 32 is fitted to the lower end portion of the cylindrical portion 46 of the diaphragm 42. They are firmly combined as one body by a generally cup-shaped combining member 48 made of synthetic resin.

Figure 3:
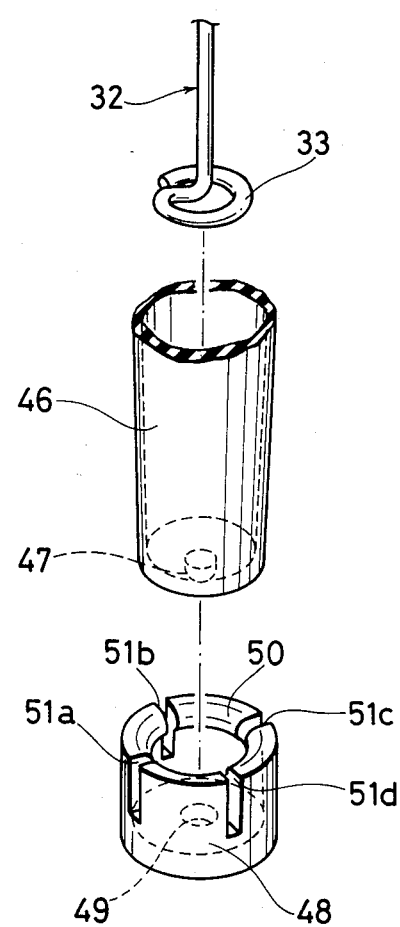
FIG. 3 is an enlarged perspective view of an important part in FIG. 1.

As shown in FIG. 3, vertical slits 51a, 51b, 51c and 51d are formed in the circumferential wall of the combining member 48. Thus, it is made deformable in the radial direction, and the lower end portion of the cylindrical portion 46 fitting to the lower end 33 of the operating rod 32 can be easily inserted into the combining member 48. Internal flange portions 50 are formed on the upper end of the combining member 48 so as to prevent the combining member 48 from falling out from the cylindrical portion 46 of the diaphragm 42.

Further, a round opening 49 is made in the bottom wall of the combining member 48. A projection 47 formed in the lower end of the cylindrical portion 46 protrudes out from the round opening 49 of the combining member 48.

A tongue 52 is integrally formed with the outside of the bottom wall 20, extending downwardly from the latter. A bolt is inserted through an opening 53 for fixing the reservoir 1 to the not-shown tandem master cylinder.

Next, there will be described operations of the above-described hydraulic reservoir 1.

It is assumed that the reservoir 1 contains a sufficient amount of brake fluid. The float 4 floats in the brake fluid by buoyancy so that the lateral projection 18 of the float 4 contacts with the dish-shaped spring 23. The reed switch 6 is open or off.

The driver or operator pushes the push button 35 through the cover 40 against the spring 37 for testing the fluid level detector 3. The operating rod 32 is moved downwards, guided by the inner cylindrical portion 31 of the cylindrical body 30. The ring 39 is moved downwards together with the operating rod 32. The cylindrical portion 46 of the diaphragm 42 is pushed downwards by the lower end 33 of the operating rod 32. The projection 47 of the cylindrical portion 46 contacts with the upper surface of the float 4. The float 4 is pushed downwards along the partitioning walls 11 and 13. When the driver or operator pushes the push button 35 through the cover 40 so that the float 4 comes to contact with the bottom wall 20, the reed switch 26 is closed by magnetic force from the permanent magnet 5. The warning device is energized. Thus, the driver or operator can confirm that the fluid level detector 3 is in order, without emptying the reservoir 1 of brake fluid.

After testing the fluid level detector 3, the driver or operator releases the push button 35. The operating rod 32 is moved upwards by action of the spring 37 and buoyancy of the float 4, guided by the cylindrical portion 31 of the cylindrical body 30. The cylindrical portion 46 of the diaphragm 42 is moved upwards together with the operating rod 32. The stopper portion 38 comes to contact with the lower end of the cylindrical portion 31 through the ring 39. Thus, the operating rod 32 and the cylindrical portion 46 of the diaphragm 42 return to the original positions.

In the above embodiment, the cylindrical body 30 having the bottom wall 29 is firmly so fitted to the opening 28 of the cap 27 that the most of the cylindrical body 30 is positioned within the inside of the reservoir 1. It defines a recess extending towards the inside of the main body 2. The cylindrical portion 31 for slidably guiding the operating rod 32 is formed within the recess. Accordingly, the upper end 34 of the operating rod 32 can be positioned within the cylindrical body 30. Thus, very little of the operating rod 32 can protrude from the upper surface of the cap 27. When the reservoir 1 is transported, or when any other apparatus near the reservoir 1 is repaired or inspected, there is little fear that the operating rod 32 is errorneously struck to be damaged by a tool or the like or is made to collide with and damage a part of the cap 27. The height of the whole reservoir 1 can be reduced, and the reservoir 1 can be small-sized.

Further, in the above embodiment, the cover 40 shields the cylindrical body 30 and the push button 35. Water is prevented from invading the inside of the reservoir 1, and the operating rod 32 and the push button 35 is protected from damage.

Further, the above embodiment has the following remarkable advantages.

No opening for inserting the operating rod 32 is made in the diaphragm 42. The cylindrical portion 46 is formed in the center of the diaphragm 42. It is closed at the lower end. The operating rod 32 is inserted into the clyindrical portion 46. In other words, the lower end portion of the operating rod 32 does not protrude into the fluid chambers 9 and 10 from the diaphragm 42, and an opening for inserting the operating rod 32 is not made in the diaphragm 42. Accordingly, it can be securely avoided that brake fluid leaks outwards through the gap between the operating rod 32 and the diaphragm 42 at the opening.

Further, in the above embodiment, the float 4 is pushed down by the projection 47 of the cylindrical portion 46 of the diaphragm 42. Accordingly, a gap is formed between the lower surface of the combining memeber 48 and the upper surface of the float 4 in accordance with the protruding length of the projection 47 from the opening 49 of the combining member 48. Because of the gap, the combining member 48 can be easily separated from the upper surface of the float 4, when the operating rod 32 is returned upwards to the original position by action of the spring 37, provided that brake fluid remains not so sufficiently in the reservoir that the upper surface of the float 4 remains to contact with the combining member 48 in the original position of the operating rod 32.

If the upper surface of the float 4 contacts directly with the lower surface of the combining member 48 without the projection 47, there is the fear that the upper surface of the float 4 remains adhering to the lower surface of the combining member 48 by surface tension of brake fluid. In that case, the fluid level detector 3 misoperates.

Further, in the above embodiment, the lower end 33 of the operatint rod 32 and the lower end portion of the cylindrical portion 46 of the diaphragm 42 are firmly held as one body by the combining member 48 made of synthetic resin. Accordingly, the diaphragm 42 can take the stable posture as shown in FIG. 1. The diaphragm 42 is made of rubber, and it is very flexible. If the combining member 48 is not used, the cylindrical portion 46 would be apt to incline from the shown vertical posture.

While the preferred embodiment has been described, variations thereto will occur to those skilled in the art within the scope of the present inventive concepts which are delineated by the following claims.

For example, in the above embodiment, the lower end 33 of the operating rod 32 is shaped in horizontal vortex. Instead, a disk may be fixed to the lower end of the operating rod.

Further in the above embodiment, the cylindrical body 30 is elastically fixed to the opening of the cap 27. Instead, the cylindrical body 30 may be integrally formed with the cap 27. Further in the above embodiment, the inner cylindrical guide portion 31 is integrally formed with the bottom wall of the cylidrical body 30. Instead, a cylindrical guide member for guiding the operating rod 32 may be firmly fitted to an opening made in the bottom wall of the cylindrical body 30.

When the operating rod is large in diameter, it may be straight without horizontal vortex 33. It can be thus avoided that the bottom of the cylindrical portion 46 of the diaphragm is damaged with the lower end of the operating rod.

A portion corresponding to the stopper portion 38 for determinining the original position of the operating rod 32 may be formed integrally with the cylindrical body 30, or it may be arranged within the cylindrical body 30.

Further, a holding apparatus may be added to the above embodiment for holding the operating rod 32 at the pushed position.

The reed switch 6 may be vertically fixed in the inside of the main body 2, or it may be fixed on the outside of the side wall of the main body 2.

When only one fluid connecting portion is formed in the main body, (two fluid connecting portions 16 and 17 in the above embodiment), the walls 11, 12 and 13 are omitted. In that case, also the post 21 and the dish-shaped spring 23 may be omitted, and the float 4 may be guided along the side wall of the main body 2. The upper position of the float 4 may be determined by the bottom of the cylindrical portion 46 of the diaphragm 42 or the combining member 48.

Further in the above embodiment, the bottom wall 20 is inclined to the horizontal line. Of course, this invention may be applied to a hydraulic reservoir having a horizontal bottom wall.

When the projection 47 is omitted from the bottom of the cylindrical portion 46 of the diaphragm 42, the opening 49 is unnecessary in the combining member 48. In the above embodiment, the projection 47 is knob-like. However, it may be annular projection.

Further, the operating rod may be guided by an opening made in the cap or by a cylindrical portion integrally formed with the cap.

What is claimed is:

1. A hydraulic reservoir with fluid level detector comprising:
   (A) a main body having an internal space for containing
   (B) a cap attached to said main body for covering a top opening of said main body;
   (C) a diaphragm arranged across said top opening of the main body, the outer circumference of said diaphragm being held between said main body and said cap, and the space between said cap and said diaphragm communicating with the atmosphere;
   (D) a reed switch fixed to said main body;
   (E) a float provided with permanent magnet, so arranged as to be vertically movable in said internal space of the main body, said reed switch and said float with permanent magnet constituting a fluid level detector, and when said float with permanent magnet is positioned under a predetermined level, said reed switch being closed by magnetic force of said permanent magnet;

(F) operating means for pushing down said float, being vertically movable and able to be pushed down from the external against buoyancy of said float; and (G) a cylindrical portion integrally formed with said diaphragm, being closed at the lower end, said operating means being inserted into said cylindrical portion and said float being pushed down through the closed end of said cylindrical portion by said operating means.

2. A hydraulic reservoir according to claim 1, in which the lower end portion of said operating means and that of said cylindrical portion of the diaphragm are firmly combined by a cup-shaped combining member which is elastically fitted to the lower end portion of said cylindrical portion of the diaphragm.

3. A hydraulic reservoir according to claim 2, in which said operating means is rod-like, and its lower end is shaped in horizontal vortex.

4. A hydraulic reservoir according to claim 1, in which an opening is formed in the upper wall of said cap, and a generally cup-shaped cylindrical body having a bottom wall is fixed to said opening of the cap, said cylindrical body defining a recess extending toward the inside of said main body from said cap, and said operating means being slidably guided in the vertical direction by a cylindrical guide portion integrally formed with the bottom wall of said cylindrical body.

5. A hydraulic reservoir according to claim 4, in which said operating means is urged by a spring arranged between the bottom wall of said cylindrical body and the top end of said operating means.

6. A hydraulic reservoir according to claim 5, in which cover means covers the top opening of said cylindrical body and the top end of said operating means.

7. A hydraulic reservoir according to claim 6, in which a push botton is fixed to the top end of said operating means.

8. A hydraylic reservoir according to claim 5, in which a stopper portion is formed in said operating means, contacting normally with the lower end of the cylindrical guide portion of said cylindrical body.

9. A hydraulic reservoir according to claim 8, in which said stopper portion contacts with the lower end of the cylindrical guide portion through a ring member fitted to said operating means.

10. A hydraulic reservoir according to claim 1, in which the lower part of said internal space of the main body is partitioned to two chambers by a generally crank-shaped wall which is integrally formed with the bottom wall of said main body, extending upwardly from the bottom wall.

11. A hydraulic reservoir according to claim 10, in which lateral projections are formed integrally with said crank-shaped wall, and vertical guide grooves are made in the opposite sides of said float, said lateral projections being slidably fitted to said grooves for vertically guiding said float.

12. A hydraulic reservoir according to claim 11, in which a lateral projection is formed integrally formed with said float, and a post having a stopper portion is vertically and integrally formed with the bottom wall of said main body, said lateral projection being engaged with said post and the upper position of said float being determined by said stopper portion.

13. A hydraulic reservoir according to claim 11, in which said permanent magnet is fixed to the lower end of said float, and said reed switch is arranged in a hole of a lateral and horizontal projection which is integrally formed with the outside of the bottom wall of said main body.

14. A hydraulic reservoir according to claim 1, in which a downward projection is formed in the lower end of said cylindrical portion of the diaphragm, said downward projection facing to the upper surface of said float.

15. A hydraulic reservoir acording to claim 14, in which the lower end portion of said operating means and that of said cylindrical portion of the diaphragm are firmly combined by a cup-shaped combining member which is elastically fitted to the lower end portion of said cylindrical portion of the diaphragm.

16. A hydraulic reservoir according to claim 15, in which said operating means is rod-like, and its lower end is shaped in horizontal vortex.

17. A hydraulic reservoir according to claim 16, in which vertical slits are formed in said combining member 18. A hydraulic reservoir according to claim 17, in which internal flanges are made in the upper end of said combining member.

19. A hydraulic reservoir according to claim 16, in which a hole is made in the bottom wall of said combining member, and said downward projection of the cylindrical portion of the diaphragm is inserted through said hole.

20. A hydraulic reservoir according to claim 1, in which the outer circumference of said diaphragm is pinched through a fixing ring between said cap and said main body.

21. A hydraulic reservoir according to claim 20, in which a cutout is made in said fixing ring, and the space between said cap and said diaphragm communicates through said cutout with the atmosphere.

22. A hydraulic reservoir according to claim 21, in which said cap and said main body are engaged with each other by threads.

* * * * *